US008063936B2

(12) United States Patent
Samarasekera et al.

(10) Patent No.: US 8,063,936 B2
(45) Date of Patent: Nov. 22, 2011

(54) MODULAR IMMERSIVE SURVEILLANCE PROCESSING SYSTEM AND METHOD

(75) Inventors: Supun Samarasekera, Princeton, NJ (US); Vincent Paragano, Yardley, PA (US); Harpreet Sawhney, West Windsor, NJ (US); Manoj Aggarwal, Lawrenceville, NJ (US); Keith Hanna, Princeton, NJ (US); Rakesh Kumar, Monmouth Junction, NJ (US); Aydin Arpa, Plainsboro, NJ (US); Philip Miller, Yardley, PA (US)

(73) Assignee: L-3 Communications Corporation, New York, NY (US)

( * ) Notice: Subject to any disclaimer, the term of this patent is extended or adjusted under 35 U.S.C. 154(b) by 738 days.

(21) Appl. No.: 11/628,376

(22) PCT Filed: Jun. 1, 2005
(Under 37 CFR 1.47)

(86) PCT No.: PCT/US2005/019673
§ 371 (c)(1),
(2), (4) Date: Dec. 1, 2006

(87) PCT Pub. No.: WO2005/120072
PCT Pub. Date: Dec. 15, 2005

(65) Prior Publication Data
US 2007/0247525 A1    Oct. 25, 2007

Related U.S. Application Data

(60) Provisional application No. 60/575,894, filed on Jun. 1, 2004, provisional application No. 60/575,895, filed on Jun. 1, 2004, provisional application No. 60/576,050, filed on Jun. 1, 2004.

(51) Int. Cl.
*H04N 7/18* (2006.01)

(52) U.S. Cl. .................................................... 348/159
(58) Field of Classification Search ................... 348/143, 348/157, 159
See application file for complete search history.

(56) References Cited

U.S. PATENT DOCUMENTS
5,321,613 A * 6/1994 Porter et al. ................... 702/1
(Continued)

FOREIGN PATENT DOCUMENTS
CN           1497327 A    5/2004
(Continued)

OTHER PUBLICATIONS

'A uniform XML-based approach to manage data acquisition hardware devices', Brigljevic, V. et al., Nuclear Science Symposium Conference Record, 2003 IEEE vol. 3, Oct. 19-25, 2003 pp. 1668-1672 vol. 3.*

(Continued)

*Primary Examiner* — Nhon Diep
(74) *Attorney, Agent, or Firm* — Tiajoloff and Kelly LLP

(57) ABSTRACT

According to an aspect of the invention, a system for providing immersive surveillance a site has a plurality of cameras each producing a respective raw video of a respective portion of the site. A processing component receives the raw video from the cameras and generates processed video from it. A visualization engine is coupled to the processing system, and receives the processed video therefrom. The visualization engine renders real-time images corresponding to a view of the site in which at least a portion of the processed video is overlaid onto a rendering of an image based on a computer model of the site. The visualization engine displays the images in real time to a viewer. The processing component comprises first and second filter modules. The second filter module processes video received as output from the first filter module. A controller component controls all transmission of data and video between the first and second filter modules.

19 Claims, 3 Drawing Sheets

CONFIGURATION BASED ON THE SYSTEM ARCHITECTURE

GENERAL DATA/CONTROL FLOW THROUGH THE SYSTEM ARCHITECTURE.

U.S. PATENT DOCUMENTS

| | | | |
|---|---|---|---|
| 5,495,576 A * | 2/1996 | Ritchey | 345/420 |
| 5,714,997 A * | 2/1998 | Anderson | 348/39 |
| 5,729,471 A * | 3/1998 | Jain et al. | 725/131 |
| 5,850,352 A * | 12/1998 | Moezzi et al. | 345/419 |
| 6,751,553 B2 * | 6/2004 | Young et al. | 702/5 |
| 7,092,628 B2 | 8/2006 | Lawther et al. | |
| 7,307,655 B1 | 12/2007 | Okamoto et al. | |
| 7,728,868 B2 * | 6/2010 | Razzaque et al. | 348/77 |
| 2003/0085992 A1 | 5/2003 | Arpa et al. | |

FOREIGN PATENT DOCUMENTS

| | | |
|---|---|---|
| JP | 10-164394 | 6/1998 |
| JP | 10-234032 | 9/1998 |
| JP | 2000-253391 | 9/2000 |
| JP | 2002-135765 | 5/2002 |
| WO | 0007373 | 2/2000 |

OTHER PUBLICATIONS

Patent Abstracts of Japan English language abstract for JP10-234032, Sep. 2, 1998.
Patent Abstracts of Japan English language abstract for JP2000-253391, Sep. 14, 2000.
Patent Abstracts of Japan English language abstract for JP2002-135765, May 10, 2002.
Patent Abstracts of Japan English language abstract for JP10-164394, Jun. 19, 1998.

* cited by examiner

Typical Mode of Operation

Video Flashlight Mode of Operation

GENERAL DATA/CONTROL FLOW THROUGH THE SYSTEM ARCHITECTURE.

MODULAR IMMERSIVE SURVEILLANCE PROCESSING SYSTEM AND METHOD

RELATED APPLICATIONS

This application claims priority of U.S. provisional application Ser. No. 60/575,895 filed Jun. 1, 2004 and entitled "METHOD AND SYSTEM FOR PERFORMING VIDEO FLASHLIGHT", U.S. provisional patent application Ser. No. 60/575,894, filed Jun. 1, 2004, entitled "METHOD AND SYSTEM FOR WIDE AREA SECURITY MONITORING, SENSOR MANAGEMENT AND SITUATIONAL AWARENESS", and U.S. provisional application Ser. No. 60/576,050 filed Jun. 1, 2004 and entitled "VIDEO FLASHLIGHT/VISION ALERT".

GOVERNMENT LICENSE RIGHTS

This invention was made with Government support under Air Force contract F30602-00-C-0143, Army contract DAAD19-01-C-0065, and Navy contracts N41756-03-C-4083 and N00014-02-C-0369. The Government has certain rights in this invention.

FIELD OF THE INVENTION

The present invention generally relates to image processing, and, more specifically, to systems and methods for providing immersive surveillance in which data or videos from a number of cameras or sensors in a particular site or environment are managed by overlaying the video from these cameras onto a 2D or 3D model of the site under surveillance.

BACKGROUND OF THE INVENTION

Effective surveillance and security are needed more now than ever at airports, nuclear power plant and other secure locations. Video surveillance is increasingly being deployed at airports and sensitive sites. To be effective in realistic situations, video-based surveillance requires robust scene understanding. In a typical surveillance and security system, multiple monitors or television screens are used, with each screen providing a view of a scene of one camera. An example of this system is shown in FIG. 1A. Operation of this system usually requires a large space and several guards.

With reliable scene understanding, however, a typical security setup or system such as that shown in FIG. 1A (with a bank of monitors and several guards) can be replaced by a single display and operator as shown in FIG. 1B. The surveillance system illustrated is known as VIDEO FLASHLIGHT™ and it is described in U.S. published patent application 2003/0085992 published on May 8, 2003, which is herein incorporated by reference. In general, automated algorithms analyze incoming video and alert the operator when a perimeter is breached, motion is detected, or other actions are reported. Visual fusion of camera locations, analysis result, and alerts, in a situational awareness system gives an operator a holistic view of the entire site. With such a setup, the operator can quickly assess and respond to potential threats.

This system provides for viewing of systems of security cameras at a site, of which there can be a large number. The video output of the cameras in an immersive system is combined with a rendered computer model of the site. These systems, such as the system shown in U.S. published patent application 2003/0085992, allow the user to move through the virtual model and view the relevant video automatically present in an immersive virtual environment which contains the real-time video feeds from the cameras overlayed on the rendered images from a computer 2D or 3D model of the site. This provides an excellent way of reviewing the video from a number, even a very large number, of video feeds from cameras.

At the same time, however, increasing the number of video cameras producing data is frequently desirable for the purpose of making the surveillance more complete, or for a larger areas, or any other reason. Unfortunately, existing surveillance systems are not designed usually for massive expansion of the amount of data that they process. Therefore it would be desirable have a system that is readily scalable to a greatly increased number of cameras or other sensors, and also extendable to include other types of sensors including radar, fence sensors, and access control systems, and yet maintains an equivalent level of capability of interpreting behavior across these sensors to identify a threat condition.

In addition, it would be desirable to have a system that provides modularity between components in the event components need to be removed, replaced or added to the system.

SUMMARY OF THE INVENTION

It is accordingly an object of the invention here to provide a system, especially a video flashlight system as described above, that is readily scalable to a greatly increased number of cameras.

It is also an object of the present invention to provide for an immersive surveillance system wherein software is organized in modules so that existing modules can be changed to new ones, and switched as necessary in a modular way to enhance functionality of the system The present invention generally relates to a system and method for integrating modular components into a single environment.

According to an aspect of the invention, a system for providing immersive surveillance a site has a plurality of cameras each producing a respective raw video of a respective portion of the site. A processing component receives the raw video from the cameras and generates processed video from it. A visualization engine is coupled to the processing system, and receives the processed video therefrom. The visualization engine renders real-time images corresponding to a view of the site in which at least a portion of the processed video is overlaid onto a rendering of an image based on a computer model of the site. The visualization engine displays the images in real time to a viewer. The processing component comprises first and second filter modules. The second filter module processes video received as output from the first filter module. A controller component controls all transmission of data and video between the first and second filter modules.

According to another aspect of the invention, a method for processing video in an immersive surveillance system for a site comprises receiving raw video from a plurality of video cameras. The raw video is processed so as to yield processed video. The processed video is transmitted to a visualization engine that applies at least part of the processed video onto a rendering of an image based on a computer model of the site, or to a database storage module that stores the processed video in a computer accessible database. The rendered image is displayed with said video overlaid to a user. The processing of the raw video to processed video is performed in at least two discrete filter steps by at least two filter modules. One filter module processes output of the other filter module. A master controller controls transmission of all video and data between the two filter modules.

Other benefits and advantages of the present invention will become apparent from the disclosure herein.

DETAILED DESCRIPTION OF THE PREFERRED EMBODIMENT

So that the manner in which the above recited features of the present invention can be understood in detail, a more particular description of the invention, briefly summarized above, may be had by reference to embodiments, some of which are illustrated in the Figures herein. It is to be noted, however, that the drawings illustrate only typical embodiments of this invention and are therefore not to be considered limiting of its scope, for the invention may embrace other equally effective embodiments.

If proper scene understanding is desired, a system architecture must be more that a set of software components connected by web services. For effective scene analysis, it is imperative that the system architecture components interact in real-time with video samples (pixels) in a frame-synchronous manner. This requirement is often difficult if open architecture is desired to enable integration of other components, i.e., to enable other components and filter processes to be easily plugged into the system, since the multiple sources of data are not necessarily synchronized. The system architecture of the present invention, however, provides these features of easy plug in without the issues of synchronization arising, and the system architecture in accordance with the invention forms the basis for plugging in new and novel scene analysis algorithms. It is scalable and extendable to include other modalities such as radar, fence sensors, and access control systems, and to interpret behaviors across these modalities to qualify a threat condition.

Systems such as VIDEO FLASHLIGHT™ integrate an advanced vision-based detection platform, e.g., such as the one called VISIONALERT™, with video recording and in-context visualization and assessment of threats. The platform of VISIONALERT™ can effectively detect motion in the scene from a moving camera, track moving objects from the same camera, and robustly reject false positives such as swaying trees, wave action and illumination changes. It can also detect activities such as loitering and perimeter breach, or alert if an unattended object is left in the scene. These analytical processes rely largely on processing of the video received, which must be converted from analog to digital if the feed is analog, and the frames thereof synchronized, etc.

Systems or visualization engines such as VIDEO FLASHLIGHT™ fuse large numbers of video feeds and overlay these on a 3D model or terrain map. The systems integrate DVRs (Digital Video Recorders) to seamlessly move backward and forward in time, allowing rapid forensic threat analysis. They are also able to integrate multiple Pan-Tilt-Zoom Camera units and provide an intuitive map/3D model-based interface for controlling and selecting the correct PTZ viewpoint.

Figure 1A:
FIG. 1A illustrates a conventional system with multiple monitor and camera operation.
Figure 1B:
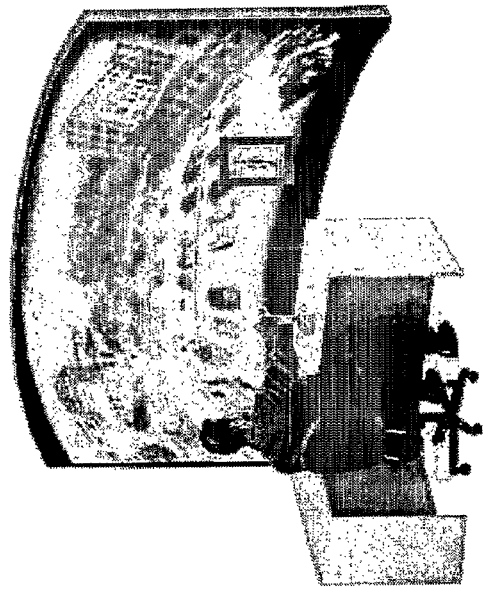
FIG. 1B illustrates a model of operation of the VIDEO FLASHLIGHT™ View Selection System.
Figure 2:
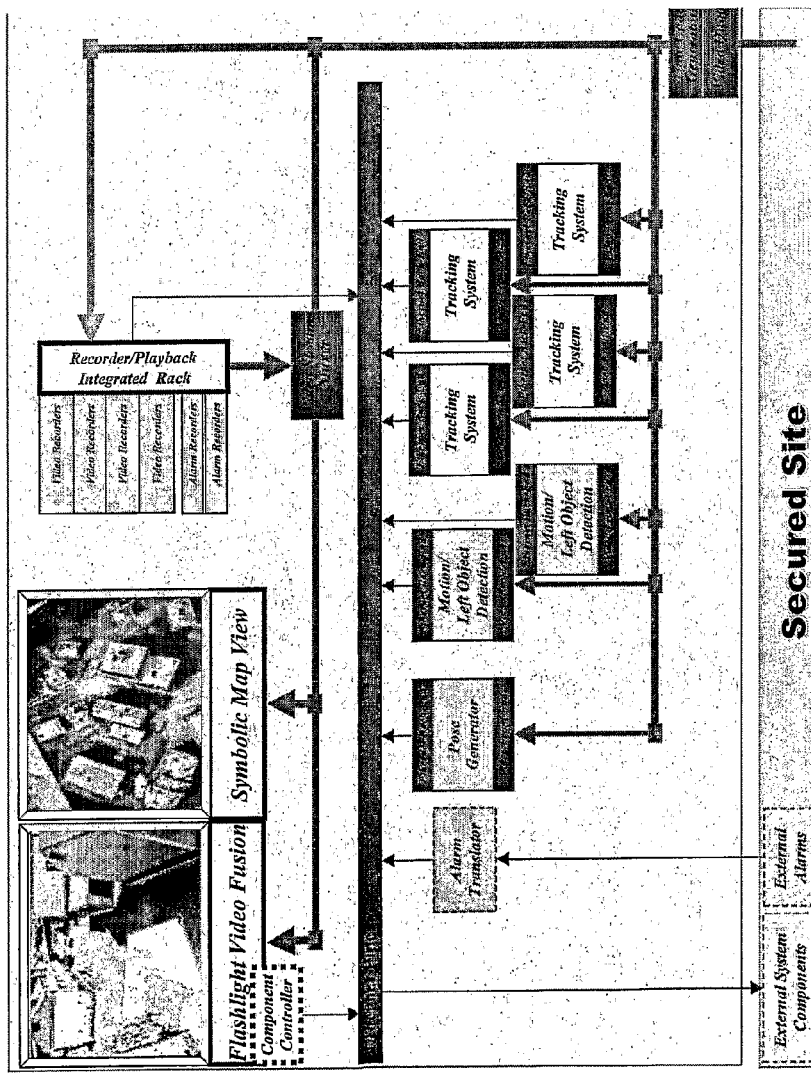
FIG. 2 illustrates a configuration diagram of the system architecture of the VIDEO FLASHLIGHT™ system.

FIG. 2 shows an example of a system architecture used for these systems. Video is provided with time codes 2 from a number of sources, not seen in the diagram. The video is processed by a number of video front-end programs, including tracking systems 3 for tracking moving objects, motion and left object detection 4, and a pose generator 5, as well as an alarm translator 6, all of which process the video or alarm outputs to obtain a data relevant to surveillance of the site, and that may be transmitted to the VIDEO FLASHLIGHT™ immersive display 7 for inclusion in a display, or for other output, as in an alert, etc. Recorded video and alarm data 8 is also played back and transmitted to the VIDEO FLASHLIGHT™ station 7 for use in the immersive display to the user.

In the present invention, a surveillance system includes a general-purpose platform to rapidly deploy a CCTV-centric customized surveillance and security system. Multiple components such as security devices, algorithms and display stations can be integrated into a single environment. The system architecture includes a collection of modular filters interconnected to stream data between the filters. The terms "filter" and "stream" are used here more broadly. Generally speaking, filters are processes that create, transform or dispose of data. Streaming does not subtend merely streaming of data over a network, but transmission, potentially even between program modules in the same computer system. As will be discussed in greater detail below (with respect to FIG. 3), this streaming allows an integrator to configure a system working across multiple PC systems maintaining a data flow.

Figure 3:
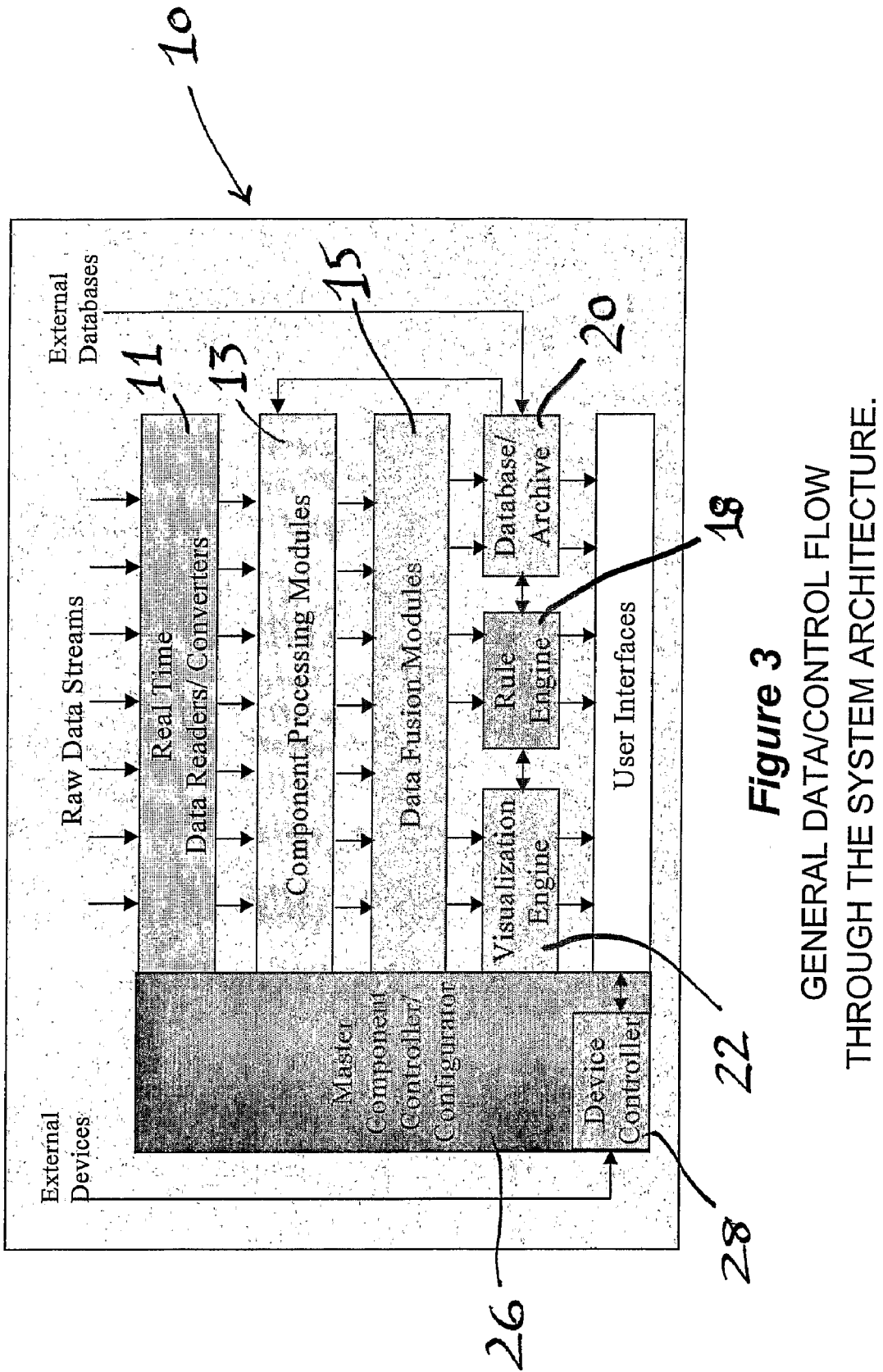
FIG. 3 is diagram of the system in accordance with a preferred embodiment of the present invention.

The objectives of the invention are accomplished using the system architecture shown in FIG. 3, which shows the system architecture in accordance with the preferred embodiment of the present invention. It should be noted that in this environment, the system is preferably a multi-processor and multi-computer system in which discrete machines are involved in many processes.

The system includes the customary components of a computer including a number of CPUs or separate computer systems linked by a network or communications interface, and having RAM and/or ROM memory, and other suitable storage devices such as magnetic disk or CD-ROM drives.

Returning to FIG. 3, the system architecture 10 is based on a hierarchal filter graph, which represents functionally the computational activities of all the linked computers of the system.

In order to create a modular processing system or component 9 in which processes could be performed in different machines, the processes by which earlier systems prepared raw video for application to an immersive model or for storing in a database were divided into distinct component operations, here referred to as "filters". Each filter can process on its own without intrusion on computations going on in other parts of the system, or to computations performed by other filters. Similarly, each filter may be performed on a different computer system.

The filter graph is composed of modular filters that can be interconnected to stream data between them. Filters can be essentially one of three types: source filters (video capture devices, PTZ communicators, Database readers, etc.), transform filters (algorithm modules such as motion detectors or trackers) or sink filters (such as rendering engines, database writers). These filters are built with inherent threading capability to allow multiple components to run in parallel, which allows the system to optimally use resources available on multi-processor platforms. In other words, the data reader/converters can run simultaneously with the component processing modules and the data fusion modules.

Furthermore, adequate software constructs are provided for buffering, stream synchronization and multiplexing.

The filters of the processing system 9 work in a hierarchal manner, in that the output of low-level processing operations (e.g., change detection, blob formation) is fed into higher-level filters (classifiers, recognizers, fusion). In the preferred embodiment shown in FIG. 3, the filters are real time data readers/converters 11, component processing modules 13, and data fusion modules 15. Raw data streams from the sensor devices are fed to real time data readers/converters 11, which convert the raw video into video with a format in common with the other video in the system. The converted data from data reader 11 is then processed by component processing modules 13, which are another step in the standardization of the video. Then, the processed data is fused with data, such as meta data indicating the direction and zoom of a PTZ camera, for example, by data fusion modules. The data fusion is usually coupled with a synchronization, in that the data fused is of the same time instant as the video frame, etc. The data fusion modules 15 output their processed data to the visualization engine 22.

Although this is one way to create a thread of filters that allows parallel processing of stages of the processing of video in the immersive surveillance system, it will be understood that there are other ways of dividing the processing of video received by the system. The critical concern is that each filter be effectively isolated from the other filters, except that it receives and/or transmits data from or to the other filters.

It should also be understood that the preferred embodiment shows a multi-processor, multi-machine environment, but the advantages of the invention may still be obtained in a single machine environment, especially where there is more than one processor.

System architecture 10 also provides rules engine 18 to rapidly prototype specific behaviors on top of these basic information packets from data fusion modules 15 to allow more complex reasoning and threat evaluation. Rules engine 18 also receives data from database/archive 20 during the processing by the rule engine 18. Data fed into the visualization engine 22 from rule engine 18 generates scene information for display by user interfaces 24 such as an appropriate sized display. Master component controller/configurator 26 communicates with and controls the operation of the filters 11, 13, 15 and database/archive 20, rule engine 18, and visualization engine 22.

Rule engine 18 works across a distributed set of databases such as database/archive 20. As a consequence, the rule engine 18 will be able to continue to operate normally even in a greatly expanded if the system is enlarged greatly. It automatically queries database/archive 20 and makes different fields available to the operator to setup complex rules based reasoning on these fields. Rule engine 18 can be integrated onto an alert station which the guard previews.

Database/archive 20 is provided to archive streaming data (original or processed) into a persistent database. This database is wrapped in a DVR-like interface to allow an operator to simultaneously record and playback multiple meta-data streams. By interfacing to database/archive 20 (module), either preferably though a web interface or a software interface, one can control the system's playback behavior. This interface provides a way for non real-time components and rule-based engines to process data. This also allows rule-based engines (described below) to query and develop complex interfaces on top of this database.

Master component 26 includes device controller 28 for controlling the sensor devices in the system, such as, for example pan/tilt/zoom cameras that can be moved by commands from the user interface or automatically by the system, as to follow an object.

Each filter 11, 13, 15 has an XML-based configuration file. The interconnectivity and the data flow is configured within the XML files. In order to access the XML files to control the behavior of the filters, an HTTP command is used along with the assigned IP address for that filter. The HTTP request is addressed by the user's browser. Accordingly, the browser receives the XML document and uses a parser program to construct the page and transform the XML into HTML format for display and viewing. In accordance with the preferred embodiment, an operator can make changes to the filter. The data changes of the filters will be sent, i.e., streamed as XML streams through network interfaces. These streams can be accessed via a SOAP (simple object access protocol) or CORBA (Common Object Request Broker Architecture) interface. The SOAP message is embedded in the HTTP request to the particular filter. In this way, new component may be added, modified, or removed from the system without any software compilation. In some cases the filter graph is modifiable at run-time to allow dynamic and adaptive assemblies of processing modules.

In summary, system architecture 10 has the following key features

System Scalability: The architecture can integrate components across multiple processors and multiple machines. Within a single machine, interconnected threaded filter components will provide connectivity. A pair of filters provides connectivity between PCs through an RPC-based transport layer.

Component Modularity. The architecture keeps a clear separation between software modules, with a mechanism to stream data between components. Each module will be defined as a filter with a common interface to stream data between filters. A filter provides a convenient wrapper for algorithm developers to rapidly develop processing components that would be immediately available for integration. The architecture enables rapid assembly of filter modules without any code rewrite. This is a benefit of the modularity obtained by the division of the processes into a thread of filter steps.

Component Upgradeability: It is easy to replace components of the system without affecting the rest of the system infrastructure. Each filter is instantiated based on XML-based configuration file. The interconnectivity and the data flow is configured within the XML files. This will allow a new component to be added, modified, or removed from the system without any software compilation. In some cases the filter graph is modifiable at run-time to allow dynamic and adaptive assemblies of processing modules.

Data Streaming Architecture: The system architecture described herein provides mechanisms to stream data between modules in the system. It will provide a consistent understanding of time across the system. Specialized filters provide synchronization across multiple data sources, and fusion filters that need to combine multiple data streams are supported. A new data stream is added by implementing a few additional methods to plug into the infrastructure. Another key aspect of data streamlining is memory usage, data copying, and proper memory cleanup. The architecture implements the streaming data as reference-counted pointers to track data as it flows through the system without having to recopy it.

Data Storage Architecture: The system architecture described herein provides an interface to archive streaming data (original or processed) into a persistent database. The database is wrapped in a DVR-like interface to allow a user to simultaneously record and playback multiple meta-data streams. By interfacing to this module, either through a software interface or through a web interface, one can control the system's playback behavior. This interface provides a way for non real-time components and rule-based engines to process data. This also allows rule-based engines (described below) to query and develop complex interfaces on top of this database.

Rule-based Query Engine: A rule-based engine works across a distributed set of databases specified above. This is a benefit from the standpoint of scalability. It would automatically query the databases and make available different fields available to the user to setup complex rules based reasoning on these fields. This engine can be integrated onto an alert station which the guard previews.

Open Architecture: The system architecture described herein supports open interfaces into the system at multiple levels of interaction. At the simplest level HTTP interfaces to all the filters will be provided to control their behavior. The data will be streamed as XML streams through the network interfaces. These can be accessed through a COBRA or SOAP interface. Also, software interfaces to the databases are published so users can integrate the database information directly. At a software level, application wizards are provided to automatically generate source code filter shells to integrate algorithms. This allows non-programmers to assemble complex filter graphs customized for scene understanding in their environment.

The foregoing description of a preferred embodiment of the invention has been presented for purposes of illustration and description. It is not intended to be exhaustive or to limit the invention to the precise form disclosed and modification and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and their equivalents.

What is claimed is:

1. A system for providing immersive surveillance of a site, said system comprising:
    a plurality of cameras each producing a respective raw video of a respective portion of the site;
    a processing component receiving said raw video from the cameras and generating therefrom processed video;
    a visualization engine coupled to the processing component and receiving said processed video therefrom, said visualization engine rendering real-time images corresponding to a view of the site in which at least a portion of said processed video is overlaid onto a rendering of an image based on a computer model of the site, the visualization engine displaying said images in real time to a viewer; and
    said processing component comprising first and second filter modules, the second filter module processing video received as output from the first filter module; and
    a controller component controlling all transmission of video from the first filter module to said second filter module; and
    wherein the computer model is a 3-D model of the site.

2. The system of claim 1 wherein the first and second filter modules are software controlled processes run on separate computers.

3. The system of claim 1 wherein the first filter module comprises a data reading and converting module that reads and converts the raw video from the plurality of cameras into converted video having a format suitable for further processing.

4. The system of claim 3 wherein the second filter module comprises a video processing module coupled to the data reading and converting module and receiving the converted video output therefrom, and further processing the converted video to data-fusion ready video for fusion with meta-data.

5. The system of claim 4 wherein the processing component comprises a third filter module that receives the data-fusion ready video from the second filter module, said controller component controlling transmission of all data and video between the second and third filter modules.

6. The system of claim 5, wherein said third filter module performs data fusion on said fusion ready video to yield said processed video.

7. The system of claim 6 wherein the second and third filter modules are each processes run on different computers.

8. The system of claim 6, and further comprising a rule engine coupled to the third filter module.

9. The immersive surveillance system of claim 1, and further comprising storing the processed video with a data storage module.

10. A method for processing video in an immersive surveillance system for a site, said method comprising:
    receiving raw video from a plurality of video cameras;
    processing said raw video so as to yield processed video;
    transmitting said processed video to a visualization engine applying at least part of said processed video onto a rendering of an image based on a 3-D computer model of the site; and
    displaying the rendered image with said video overlaid to a user;
    said processing of said raw video to processed video being performed in at least two discrete filter steps by at least two filter modules, one filter module processing output of the other filter module; and
    controlling with a master controller transmission of said output between the two filter modules.

11. The method of claim 10 wherein the first and second filter processes are performed by different computers.

12. The method of claim 10 wherein the processing of one of said filter modules includes data reading or converting the raw video.

13. The method of claim 10 wherein the processing of one of said filter modules includes preparing the video for data fusion with meta-data.

14. The method of claim 10 wherein the processing of one of said filter modules includes fusing meta data with the video.

15. The method of claim 10 wherein the processing of said raw video to processed video is performed in at least three discrete filter steps by the two filter modules and a third filter module, with all data transmission therebetween controlled by said controller.

16. The method of claim 15 wherein the filter steps are data reading/converting; component processing; and data fusion, respectively.

17. The method of claim 10 wherein, while the second step of processing is being performed by the second filter module, the first filter module is performing the first filter step on a subsequently received raw video.

18. The method of claim 10 wherein said processed video is transmitted to said visualization engine.

19. The method of claim 10 wherein the filter modules are instantiated based on XML files, and wherein the transmission of data between said filter modules is configured by said XML files.

* * * * *